US012596393B2

(12) United States Patent
Loreti et al.

(10) Patent No.: US 12,596,393 B2
(45) Date of Patent: Apr. 7, 2026

(54) PARALLEL OPTICAL COMPUTING SYSTEM

(71) Applicant: ACCORD PACIFIC EUROPE SA, Lugano (CH)

(72) Inventors: Luigi Loreti, Rome (IT); Maurizio Vagli, Lugano (CH); Giovanni Todeschini, Lecco (IT)

(73) Assignee: Accord Pacific Europe SA, Lugano (CH)

( * ) Notice: Subject to any disclaimer, the term of this patent is extended or adjusted under 35 U.S.C. 154(b) by 802 days.

(21) Appl. No.: 17/917,796

(22) PCT Filed: Apr. 9, 2020

(86) PCT No.: PCT/IB2020/053388
§ 371 (c)(1),
(2) Date: Oct. 7, 2022

(87) PCT Pub. No.: WO2021/205213
PCT Pub. Date: Oct. 14, 2021

(65) Prior Publication Data
US 2023/0134888 A1    May 4, 2023

(51) Int. Cl.
*G06E 3/00* (2006.01)
*G02F 1/01* (2006.01)

(52) U.S. Cl.
CPC ........... *G06E 3/005* (2013.01); *G02F 1/0126* (2013.01)

(58) Field of Classification Search
CPC .............................. G06E 3/005; G02F 1/0126
See application file for complete search history.

(56) References Cited

U.S. PATENT DOCUMENTS

| | | | | |
|---|---|---|---|---|
| 11,734,556 B2 * | 8/2023 | Meng | .................... | G06N 3/0675 |
| | | | | 706/43 |
| 2005/0018259 A1 * | 1/2005 | Holmes | ................ | G02B 6/3556 |
| | | | | 359/3 |

(Continued)

FOREIGN PATENT DOCUMENTS

| | | |
|---|---|---|
| JP | H04-051224 A | 1/1993 |
| JP | H02-085831 A | 8/1993 |
| JP | H05-210139 A | 1/1996 |

OTHER PUBLICATIONS

J. Yang et al., "Routing algorithm of folded multistage optical interconnection network," IEEE Int'l Conf. on Computer Science and Automation Engineering (CSAE), 2012, pp. 337-342, doi:10.1109/CSAE.2012.6272610.

*Primary Examiner* — Anne M Hines
(74) *Attorney, Agent, or Firm* — Baker Botts L.L.P.

(57) ABSTRACT

A parallel optical computing system is described, said system comprising:

at least one first module (10) comprising at least one polarization filter (12) and at least one liquid crystal cell (13), the first module (10) being configured as an optical modulator (100) for receiving light from a light source (70) and for encoding the light output from the liquid crystal cell (13) into optical data to be processed;

at least one second module (20) comprising at least one polarization filter (22) and at least one liquid crystal cell (23), the second module (20) being able to be configured as an optical processor (200) for receiving the optical data to be processed and for outputting an optical result of the processing;

at least one optical detector (40), designed to receive the optical result of the processing and convert the optical result into a corresponding electrical result.

14 Claims, 10 Drawing Sheets

(56) References Cited

U.S. PATENT DOCUMENTS

| 2010/0085496 A1* | 4/2010 | New ....................... | G06E 3/003 |
| | | | 359/107 |
| 2024/0277208 A1* | 8/2024 | Bossy ................... | A61B 1/043 |

* cited by examiner

PARALLEL OPTICAL COMPUTING SYSTEM

FILED OF APPLICATION

The present invention relates to a parallel optical computing system. The present invention also relates to a parallel optical computing method.

PRIOR ART

It is known that in the parallel optical computing sector efforts are being made to develop systems which are able to process light instead of electricity.

These systems have been developed in an attempt not only to accelerate the transmission interface to and from telecommunications networks, which already transmit by means of optical fibres, but also to increase the computing speed within said systems, therefore making it possible to use the systems for high-complexity computational calculations, such as applications in neuronal and artificial intelligence networks in general.

The currently known systems, however, have a number of drawbacks associated mainly with the complexity of the interface between the optical computing system and an external digital—typically binary coding—system and the complexity of implementing the calculations within the optical system itself, in view of the fact that its use industrially, and not just for research purposes, requires it to be reprogrammable and that effective widespread use thereof may be achieved only by means of reasonably compact hardware.

The technical problem underlying the present invention is therefore that of devising a parallel optical computing system with optimum performance features both as regards the input and output of the data to and from external systems, including telecommunication networks, and as regards the information processing and associated calculation operations intrinsically performed within the system, while also employing a highly versatile software and hardware configuration, overcoming essentially all of the limitations and drawbacks which hitherto affect the known optical computing systems.

SUMMARY OF THE INVENTION

The idea underlying the present invention is that of programming liquid crystal cells in order to perform parallel optical computing, and in particular programming of the cells for modulation of the light which is representative of an input of the calculation to be performed, both in order to perform the calculation, based on the modulated light representing the input, and to output a result of the calculation in the form of light which can be detected by an optical sensor (detector).

Advantageously, since the cells may be reprogrammable both for modulation and for calculation, based on the aforementioned idea, it is possible to represent multiple sets of input data and perform different multiple operations on the data sets, each one of said multiple representations and operations corresponding to predefined programming of the modulation and calculation cells, below also indicated as forming part of a so-called first module of a parallel optical computing system, designed for modulation, and a second module of the computing system, designed for operation as a processor of the computing system.

Based on the aforementioned idea, the Applicant has devised various embodiments of the parallel optical computing system, which differ from each other in terms of major advantages possible as regards not only the spatial configuration and arrangement of the first module and second module, but also the expansion of the number of modules of the computing system used for modulation and number of modules used for calculation, and the relative spatial configuration of the modules, whilst all being based on the principle of the aforementioned idea.

In the various embodiments, the parallel optical computing system comprises:

- at least one first module comprising at least one polarization filter and at least one liquid crystal cell, the first module being configured as an optical modulator for receiving light from a light source and for encoding the light output from the liquid crystal cell into optical data to be processed;
- at least one second module comprising at least one polarization filter and at least one liquid crystal cell, the second module being able to be configured as an optical processor for receiving the optical data to be processed and for outputting an optical result of the calculation;
- at least one optical detector, designed to receive the optical result of the calculation and convert the optical result into a corresponding electrical result.

The first module and/or the second module may comprise multiple liquid crystal cells, thus increasing the parallel computing capacity of the computing system. The description which follows, at least initially, is based on the minimum configuration of the modules, only for the sake of easier description, but it is obvious that the same modules are not limited in terms of the number of liquid crystal cells.

According to one embodiment, the optical computing system has a configuration of the type in which at least one prism is positioned to receive optical data from the first module and reflect the optical data to the second module, where the first module and second module are vertically aligned. Specific details of the configuration illustrated here are provided in the detailed description of the present disclosure and with reference to the drawings. Essentially, the prism comprises a base parallel to the cells of the first module and second module, situated facing them, and inclined walls connected to the base, for reflecting the optical data from the first module to the second module.

According to one aspect, the second module is configured as an optical processor and the optical detector is configured to receive the optical result from the second module.

According to another aspect, the optical computing system comprises at least one third module vertically aligned with the first module and the second module, underneath the second module, and configured to receive the optical data from the second module, and according to this aspect the second module is configured as a second optical modulator (and therefore not necessarily as a processor) or as an optical processor and said third module is configured, respectively (i.e. depending on the configuration of the second module), as an optical processor or as a second optical processor. At least one second prism is configured to receive the optical data from the second module and to reflect the optical data to the third module. The second prism comprises a base parallel to the cells of the second module and third module, situated facing them, along a surface of the second module situated opposite to the surface of the second module where the first prism is situated, and inclined walls connected to the base, for reflecting the optical data from the second module to the third module. The optical detector is configured to receive the optical result from the third module, at least in this possible configuration.

Other spatial configurations are however envisaged by the Applicant and the specific details are only briefly mentioned hereinbelow and described more fully in the detailed description of the present disclosure and with reference to the drawings, in which the reference numbers facilitate the understanding of the possible examples of embodiment of the computing system.

For example, the first module of the optical computing system may be positioned facing the second module (and therefore not be necessarily vertically aligned).

Also according to this variant, the optical computing system may comprise a third module, in this case situated facing the second module, and the third module configured as an optical processor and the optical detector configured to receive the optical result from the third module.

As already mentioned, also in the further embodiments of the optical computing system, each of the first module, second module or third module may comprise multiple liquid crystal cells arranged horizontally and/or vertically adjacent in a plane of the first module, second module or third module.

Further characteristic features and advantages of the parallel optical computing method and computing system according to the present invention are provided with reference to the description below and the attached figures, provided merely by way of a non-limiting example of the present invention.

BRIEF DESCRIPTION OF THE ATTACHED FIGURES

DETAILED DESCRIPTION

Figure 1:
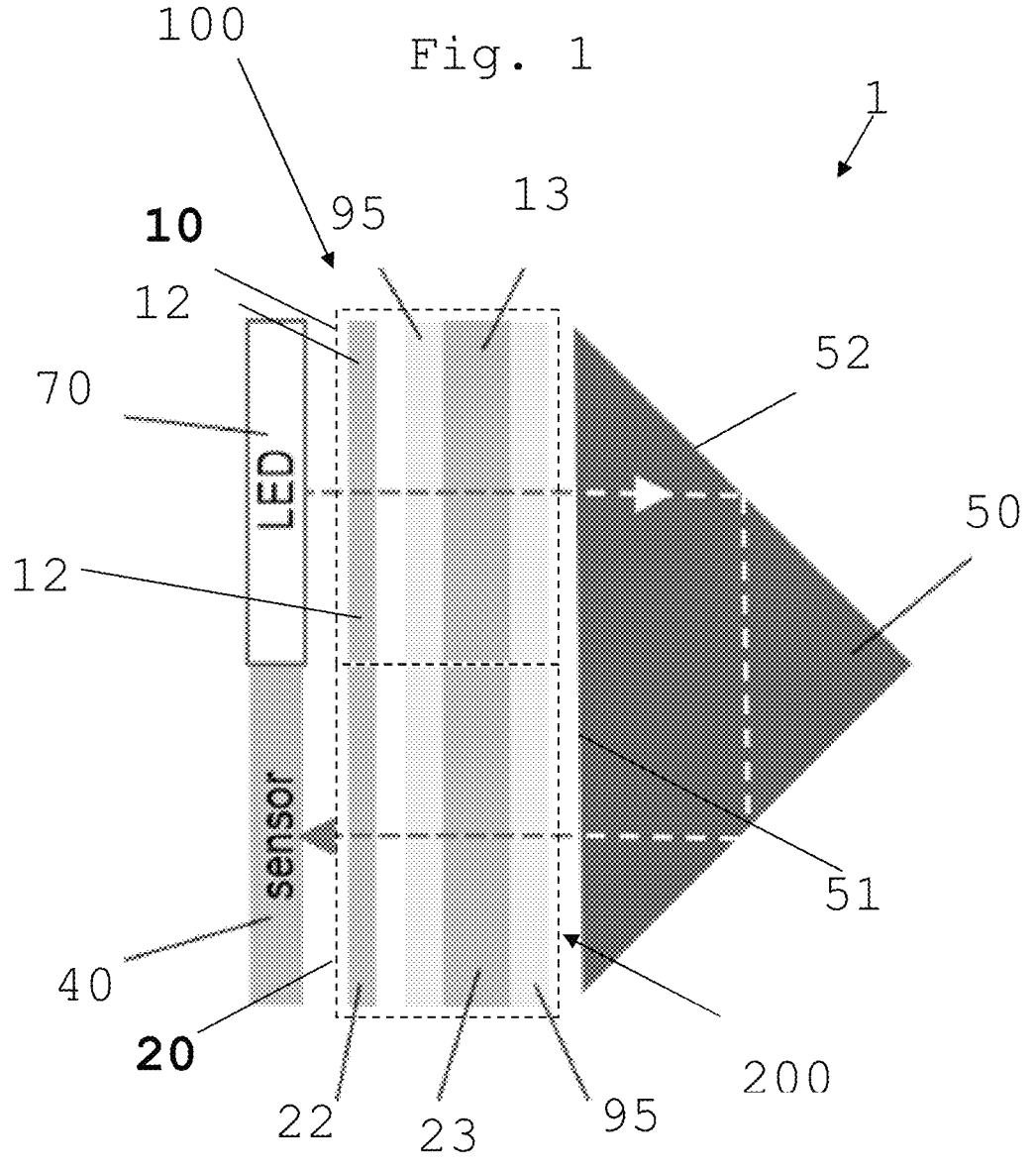
FIG. 1 is a schematic illustration of the optical computing system according to the present disclosure.

With reference to the attached figures, 1 represents and schematically denotes a parallel optical computing system according to the present invention, referred to below also in short as "computing system".

The computing system 1 comprises a plurality of liquid crystal cells grouped together in modules and in particular at least one first module 10 and a second module 20 (FIGS. 1 and 3, for example) and optionally a third module 30 (FIGS. 2 and 4 for example) or further additional modules. Specific modules are deigned to implement a specific function, in particular a light modulation function 100, 101 and a computing function 200, 201, as will become clear from the description below.

The operating principle of the computing system 1 is independent of the number of liquid crystal cells included in the first module 10 and/or in the second module 20 (and/or in the third module 30 and/or in additional modules) and therefore, for the sake of easier description, a computing system 1 may be regarded as having only one liquid crystal cell 13, 23, respectively, for each of said first module 10 and second module 20 (and optionally a third liquid crystal cell 33 for the third module 30). Despite the aforementioned clarification, it should be pointed out that the industrialization of the computing system 1 is particularly suitable—and therefore as envisaged by the Applicant—for the use of multiple liquid crystal cells for each of the first module 10 and second module 20 (and optionally third module 30) and, as will become clear from the description below, in some embodiments, with multiple modules for each function, in particular for the light modulation function and the optical computing function, in order to increase the parallelism of the data processing. Therefore, as regards the description below, the characteristic features described below in connection with each module are independent of the number of liquid crystal cells.

The liquid crystal cells 13, 23, 33 are situated between two glass walls 95 and are intended to be crossed by infinite light rays emitted by a non-polarized white light source 70. The white light source 70 is situated at the input of the computing system 1, as a light source. For example, the white light source 70 comprises a plurality of LEDs.

According to the present invention, the light emitted by the light source 70 is intended to be modulated by the first module 10, depending on a configuration or state of the liquid crystal cells 13, so as to represent an information or data to be processed. The light thus modulated, i.e. the light output from the first module 10, is then input into the second module 20 (and optionally the third module 30 or additional modules), where processed, depending on a configuration or state of the liquid crystal cells 23, 33 of the second and/or third module. According to different embodiments, the second module and/or the third module and/or additional modules may be associated with the modulation function or computing function.

A brief description of the method of processing the light in the modules is provided below.

The light is formed by a plurality of light rays which in reality are obtained by the superimposition of light rays emitted randomly by a large number of atoms. In order to perform a parallel optical computing process, the computing system 1 according to the present invention is configured to polarize the light rays, substantially ordering them for their subsequent processing by means of the liquid crystal cells of the first module 10 and the second module 20 (and optionally the third module 30 and any additional modules).

This control operation is performed, among other things, by means of at least one polarization filter 12 included in the first module 10 and at least one second polarization filter 22 included in the second module 20 (or additional filters for the third and/or additional modules). The light rays are intended to be further controlled by the modules 10, 20 (30), and in particular by the liquid crystal cells 13, 23, 33 of the modules, which are activated by means of multiple electrical impulses applied to multiple electrical contacts of the said liquid crystal cells.

In the modules 10, 20 (30), the electric field is applied with predetermined programming so that the crystals of the liquid crystal cells 13, 23 (33) are aligned so as to allow or not allow a phase shift of the light previously polarized by the filters 12, 22, (32) depending in the programming which is to be performed in order to modulate the light (in the first module 10) and perform the calculation (in the second module 20), for example a phase shift of 0° or 90°.

Figure 5:
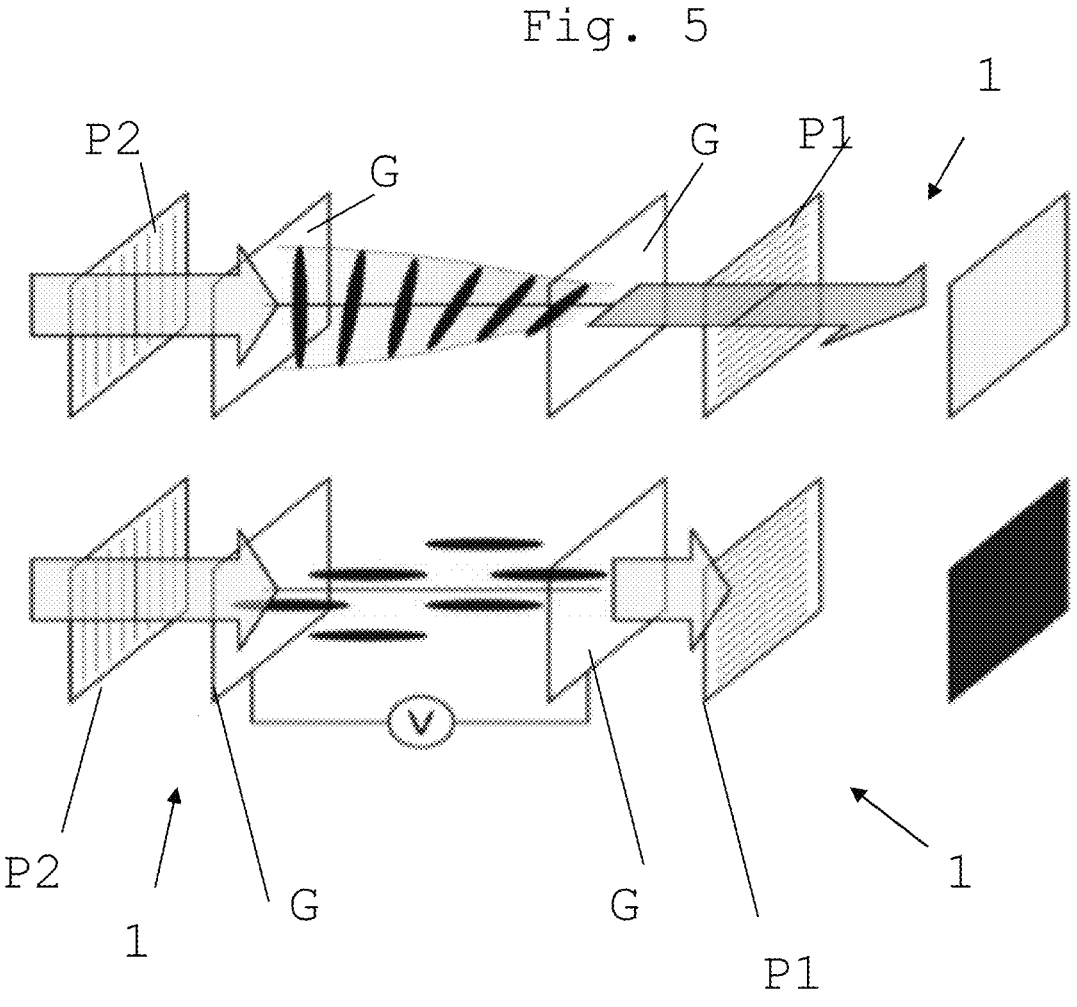
FIG. 5 is a schematic illustration of the basic principles which led the Applicant to devise the optical computing system provided in the present disclosure.

FIG. 5 shows in schematic form the operating logic of the liquid crystal cells 12, 23 (33) which may be used to form the first module 10 and the second module 20.

The top part of FIG. 5 shows the OFF state of a single image element (pixel) of a twisted nematic light modulator LCD which operates in "normally white" mode, namely a mode in which the light is transmitted when no electric field is applied to the liquid crystal. In the OFF state, namely when no electric field is applied, a twisted configuration (helicoidal or helical structure) of molecules of nematic liquid crystals is formed between two glass layers G in FIG. 5 which are separated by various spacers and lined with transparent electrodes (not shown). The same electrodes are lined with alignment layers (also not shown in FIG. 5) which precisely twist the liquid crystal through 90° when no external field is present, as therefore shown in the top part of FIG. 5.

If a light source with polarization (indicated by the incoming horizontal arrow, on the left-hand side in FIG. 5) illuminates the front part of a screen, the light passes through the first polarizer P2 and from the polarizer passes to the liquid crystal, where it is rotated by the helicoidal structure. The light is then suitably polarized so as to pass through the second polarizer P1 set at 90° with respect to the first one. In the example shown in FIG. 5 (top of the figure), therefore, the light passes through the rear of the cell and the image appears transparent (white rectangle on the right). This appearance of the light (transparent) can be associated with optical information.

In the ON state, instead, namely when a field is applied between the two electrodes, the crystal is realigned with the external field (bottom of FIG. 5). This configuration prevents the rotation of the crystal which, consequently, does not reorient the polarized light which passes through the liquid crystals. In this case, the light is blocked by the rear polarizer P1 and the image has an opaque appearance (black rectangle on the right). This appearance of the light (opaque) can be associated with optical information different from that associated with the first appearance (transparent) of the light.

Based on the operating logic described above, each module, namely the first module 10 and the second module 20 of the computing system 1, and any other modules 30, etc., may be formed using the filters P1, P2. These filters, according to different embodiments, are indicated in the Figures by 12 and 22 (FIG. 1) and 32 (FIG. 2), for example, and the liquid crystal cells by 13, 23 (FIG. 1) and 33 (FIG. 33). Each of said cells allows the light to be controlled, as described above.

The computing system 1 may be advantageously interfaced, at the input and/or output, respectively, with a serial input interface which provides the data to be processed in the form of electric signals and/or a serial output face configured to receive the electrical data already processed by the computing system 1, after it has modulated and then processed in parallel a very large number of mathematical operations in parallel. The electrical input data is converted into light which is correspondingly modulated by means of the first module 10 of the computing system 1. Similarly, the optical data processed by the computing system 1, in particular the data processed by the second module 20, is reconverted into data or electric signals by an optical detector 40 of the computing system 1.

The hardware of the first module 10 and the second module 20 comprises electro-optical modulation devices; in principle, the hardware of the first module 10 and the second module 20 may be very similar or even correspond, but it is the programming of the hardware which determines the modulation or computing function in the system 1, providing the first module 10 essentially with the function of an "optical modulator" and the second module 20 with the function of an "optical processor", at least in one of the possible embodiments of the computing system 1.

The conversion of the information into optical data allows parallel processing to be performed by applying different variants of the mathematical logic, for example a multivalue mathematical logic. The final result of the processing of the computing system 1 may be re-directed to one or more other successive computing systems 1, namely other parallel optical computing systems, or may be reconverted into serial data by means of the optical detector 40, as already mentioned above.

According to the example of embodiment shown in FIG. 1, the liquid crystal cells are grouped to form a first light modulator module 10 and a second computing module 20, are vertically aligned with each other in a plane and therefore are coplanar, and are intended to form a device, or display, with a predetermined size (in inches). In this embodiment, the vertically arranged cells face an optical prism 50 designed to deviate through 180 degrees the light rays output from the cells of the first modules 10 towards corresponding cells of the second module 20, by means of displacement on the display by an amount equal to the size of the said cells. Still according to this embodiment, which refers therefore to a precise, particularly compact, spatial configuration of the modules and respective cells, the optical detector 40 faces the second module 20, along a surface of the second module 20 opposite to the surface of the second module designed to receive at its input the light from the first module 10, after suitable deviation by the first optical prism 50.

The computing system 1 of the type shown in FIG. 1 may be advantageously used to perform computing operations using binary algebra. The non-polarized light source 70 emits light rays which are controlled by (at least one) first polarization filter 12 and then enter into the cell 13 of the first module 10. The polarization filter 12 and the cell 13 of the first module 10 form the optical modulator 10 of the computing system 1, which has the function of modulating the light so that it represents serial data to be processed.

The light rays, which correspond to information to be processed, are emitted from the optical modulator 10 and are deviated through 180 degrees by the prism 50, so as to enter into the second module 20, comprising the second liquid crystal cell 23, which is arranged vertically alongside the first module, i.e. with the respective cells of the modules 20, 10 which are substantially coplanar. The light rays which pass through the cell 23 of the second module 20 have a polarization which depends on the state of the cell 23 and can be programmed in advance depending on a calculation to be performed using the second module 20 and cross the polarization filter 22. Finally, the light rays output from the polarization filter 22 are detected by the optical detector 40 and represent the result of the computing system 1.

As already mentioned, the computing system 1 may be configured to perform multi-value logic computing operations. For example, with reference to FIG. 2 (which however is not limited to a use based on multi-value computing logic), the computing system 1 is configured to comprise a third module 30. The computing system 1 in particular comprises three modules 10, 20, 30 each having at least one liquid crystal cell 13, 23, 33, a light source 70, polarization filters 12, 22, 32, two optical prisms 50 and 80, and an optical detector 40. The non-polarized light source 70 emits light rays which are controlled by the first filter 12, before entering into the cell 13 of the first module 10 and crossing a second polarization filter 42. The two polarization filters 12, 42 and the cell 12 of the first module 10 form the optical modulator 10.

The light rays suitably modulated, i.e. in order to correspond to the data to be processed in optical form, exit the optical modulator 10 and enter the prism 50, from where they are deviated, in the example given through 180 degrees, towards a polarization filter 82 of the second module 20, and from the filter 82 to the liquid crystal cell 23 of the second module 20. The liquid crystal cell 23 of the second module 20 is vertically aligned, i.e. coplanar, with the cell 13 of the first module 10, and both the cells 13, 23 have a surface parallel to a surface or base of the prism 50, which is configured to input into the prism 50 the rays of light modulated by the first module 10 and to output again the same light rays, re-directing them towards the input of the second module 20, in particular the polarization filter 82, based on a very compact hardware structure.

The light rays which cross the second cell 23 continue with a given polarization, as already mentioned depending on the programming of the cell 23, and cross the polarization filter 22 of the second module 20 from where they exit towards the second prism 80.

The second prism 80 has the same function of deviating the light rays of the first prism 50, but is situated between the second module 20 and a third module 30, namely with a surface of the prism 80 facing, i.e. parallel to, the surface of the cells 23 and 33 of the second and third module 20, 30 and to the surface of the respective filters 22, 32, in particular suitably spaced from them so that the light ray emitted by the cell 23 of the second module 20 enters exactly into the cell 33 of the third module 30. This entry into the cell 33 of the third module 30 is controlled by the filter 32 of the module 30, which is situated between the prism 80 and the cell 33.

The flow of the light ray through the third module 30 therefore does not require further explanation here and reaches, via a filter 62 of the third module 30, the optical detector 40.

The light rays which pass along the cell 33 of the third module 30 have a polarization which depends on the state of the cell 33 and can be programmed in advance depending on a calculation to be performed with the third module 30 and cross the polarization filter 62. Finally, the light rays output from the polarization filter 62 are detected by the optical detector 40 and represent the result of the computing system 1.

Figure 2:
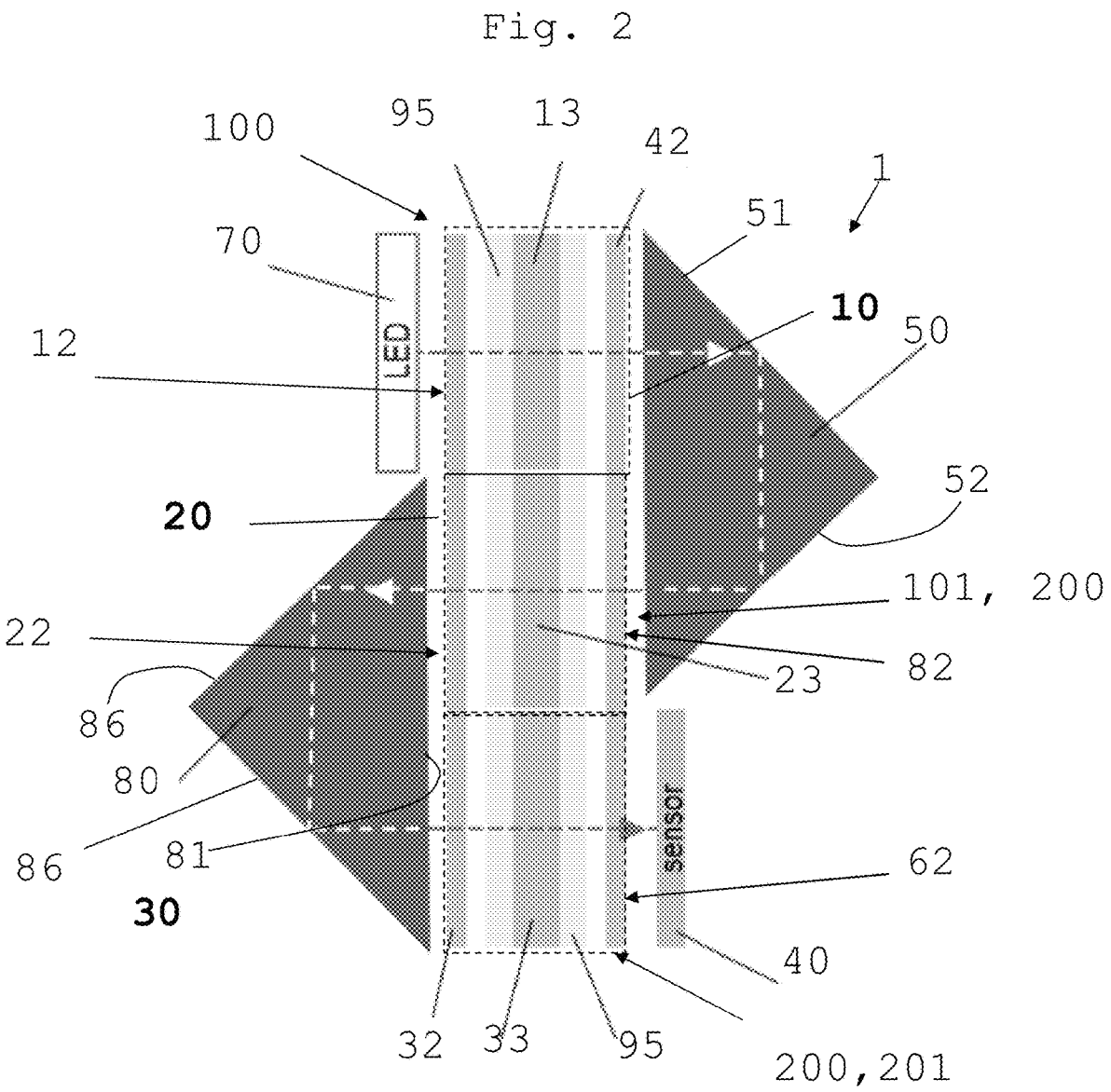
FIG. 2 is a schematic illustration of the optical computing system according to a variant provided in the present disclosure.

What is instead worth further clarification, in connection with the possible embodiment of FIG. 2, is the fact that the second module 20 may be configured as an optical modulation module or as a computing module, i.e. by being configured as an additional modulator with respect to the first modulation module 10 or as an additional processor with respect to a second computing module, which is formed by the third module 30.

The third module 30 may in fact be configured as a first computing module, in the case where the second module 20 is configured as a second modulation module, or as a second computing module, in the case where the second module 20 is configured as the first computing module.

The description provided hitherto with reference to FIGS. 1 and 2 relates to a computing system 1 formed, in a so-called minimal configuration, by only two liquid crystal cells or by three liquid crystal cells, namely by one cell for each of the modules described. However, as already mentioned, the structure may be amplified so that multiple cells are included in each of the modules in the configuration of FIG. 1 or 2, and/or so that multiple modulation and/or computing modules are used, in vertical and/or horizontal adjacent arrangements which form a kind of screen of the computing system 1.

Figures 6, 7:
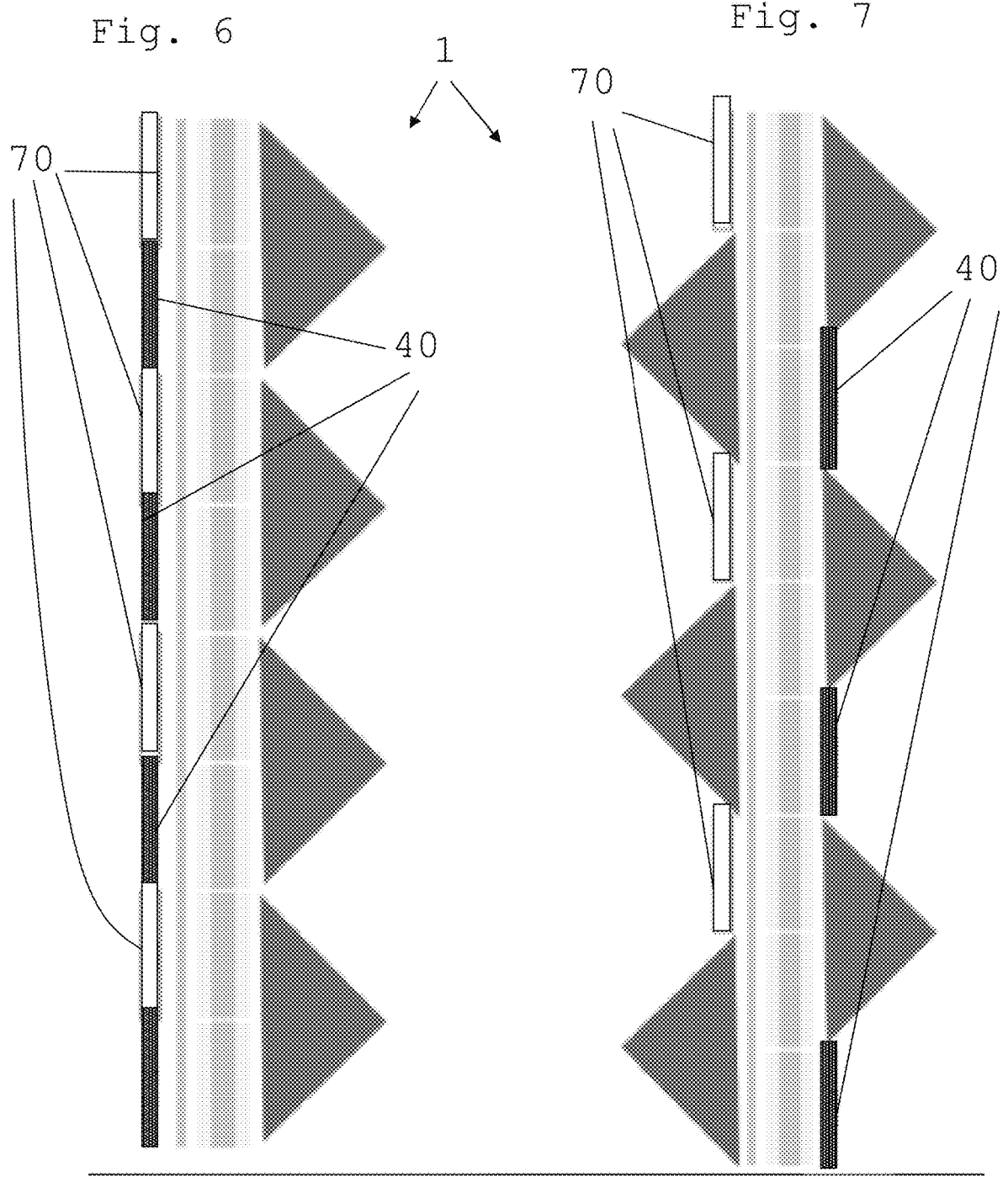
FIG. 6 is a schematic illustration of the optical computing system according to another variant provided in the present disclosure.
FIG. 7 is a schematic illustration of the optical computing system according to a further variant provided in the present disclosure.

FIGS. 6 and 7 show an expanded form of the system shown in FIGS. 1 and 2, respectively. Both in FIG. 6 and in FIG. 7, the structure of the modules, the filters and the sources may be repeated vertically and horizontally, thus expanding the computing system along two directions X, Y of a plane, corresponding to a substantially bidirectional expansion in the form of an optical screen of the optical system 1. In order to increase further the computational power a so-called three-dimensional expansion of the computing system is also envisaged where multiple screens are arranged side-by-side in parallel along a direction Z, perpendicular to the directions X and Y.

Furthermore, according to different embodiments or embodiments which can be combined with those described above, the spatial configuration of the components of the computing system 1, namely the mutual arrangement of the modules 10-30, the light source 70 and the detector 40, may be different and, according to some embodiments, do not require positioning alongside a prism. This is for example the case of embodiments provided by way of example with reference to FIGS. 3 and 4.

Figure 3:
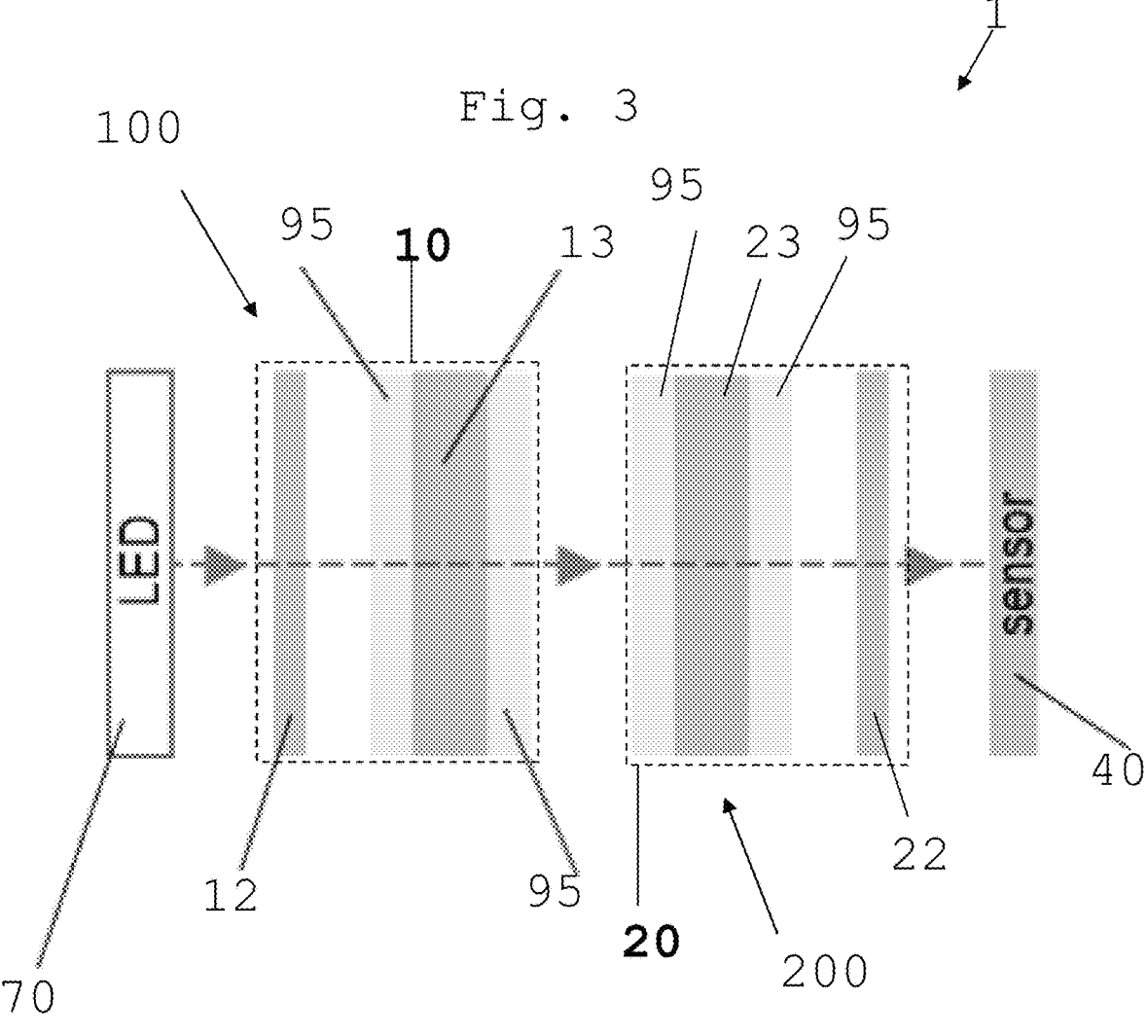
FIG. 3 is a schematic illustration of the optical computing system according to another variant provided in the present disclosure.

In FIG. 3, the first module 10 and the second module 20 are facing each other and arranged between the light source 70 and the detector 40, along an axis perpendicular to the surface of the first filter 12, to the surface of the cell 13 of the first module 10, to the surface of the cell 23 of the second module 20 and to the surface of the second filter 22. In a manner similar to that described with reference to FIG. 1, in the case of this example of embodiment also, the first module 1 is configured as a modulator 100 and the second module 2 as a processor 200.

Figure 4:
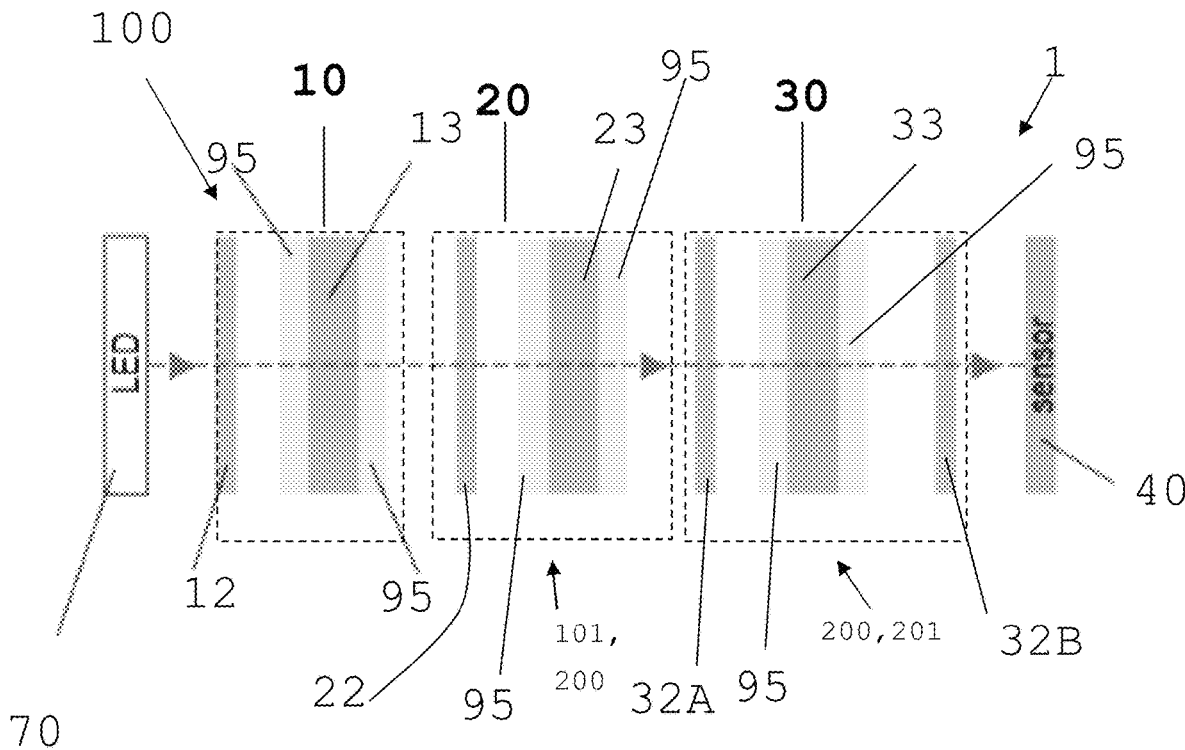
FIG. 4 is a schematic illustration of the optical computing system according to a further variant provided in the present disclosure.

In FIG. 4, the first module 10 and the second module 20 are again facing each other and arranged between the light source 70 and the detector 40, along an axis perpendicular to the surface of the first filter 12, to the surface of the cell 13 of the first module 10, to the surface of the cell 23 of the second module 20 and to the surface of the second filter 22. However, in this example of embodiment, a third module 30 is further inserted between the second module 20 and the detector 40 and comprises a cell 33 and two filters 32A and 32B having surfaces perpendicular to the axis. In this case, in a manner similar to that described with reference to FIG. 2, the first module 1 is configured as a modulator 100, the second module 2 can be configured as a second modulator 101 or as a first processor 200, and the third module can be configured as a first processor 200 or as a second processor 202.

Figure 8:
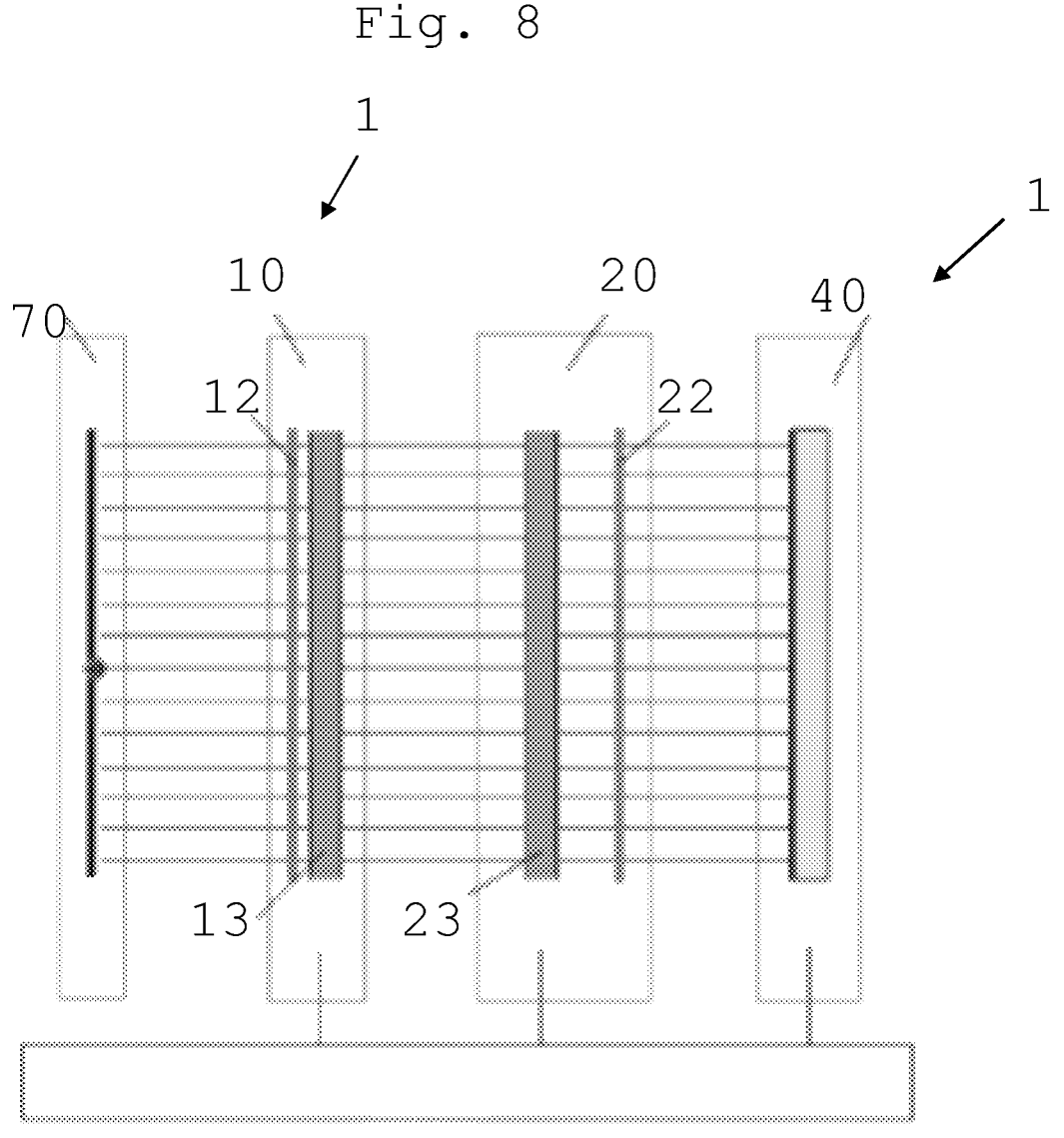
FIG. 8 is a schematic illustration of the optical computing system according to yet another variant provided in the present disclosure.

FIG. 8 shows schematically an expanded form of the system according to FIG. 3 or 4, comprising multiple liquid crystal cells for each module. In particular, the non-polarized white light source is denoted by 70 and is configured to emit a plurality of light rays intended to be controlled by at least a first polarization filter 12 and by multiple cells 13 of a first module 10, for example in the form of a first LCD screen 10.

The first polarization filter 12 and the cells 13 of the first module 10 form the optical modulator 100 of the computing system 1, which has the function of converting the serial data into optical data to be processed.

The first module 10 produces at its output a plurality of light rays corresponding to the multiple cells 13 of the module 10, each ray having a polarization dependent on a state of the respective cell 13. The light rays are input into the respective cells 23 of the second module 20. These rays are processed by the second module 20, in particular each ray is processed by a corresponding cell 23 of the second module 20, depending on the state of the cell 23. The rays thus processed represent the result of the computing system 1, intended to be detected by a plurality of sensors of a detector 40, each sensor being associated with a ray output by the second polarization filter 22 situated between the detector 40 and the second module 20.

An expanded computing system 1 may be similarly obtained from the basic structure shown in FIG. 4.

Figure 11:
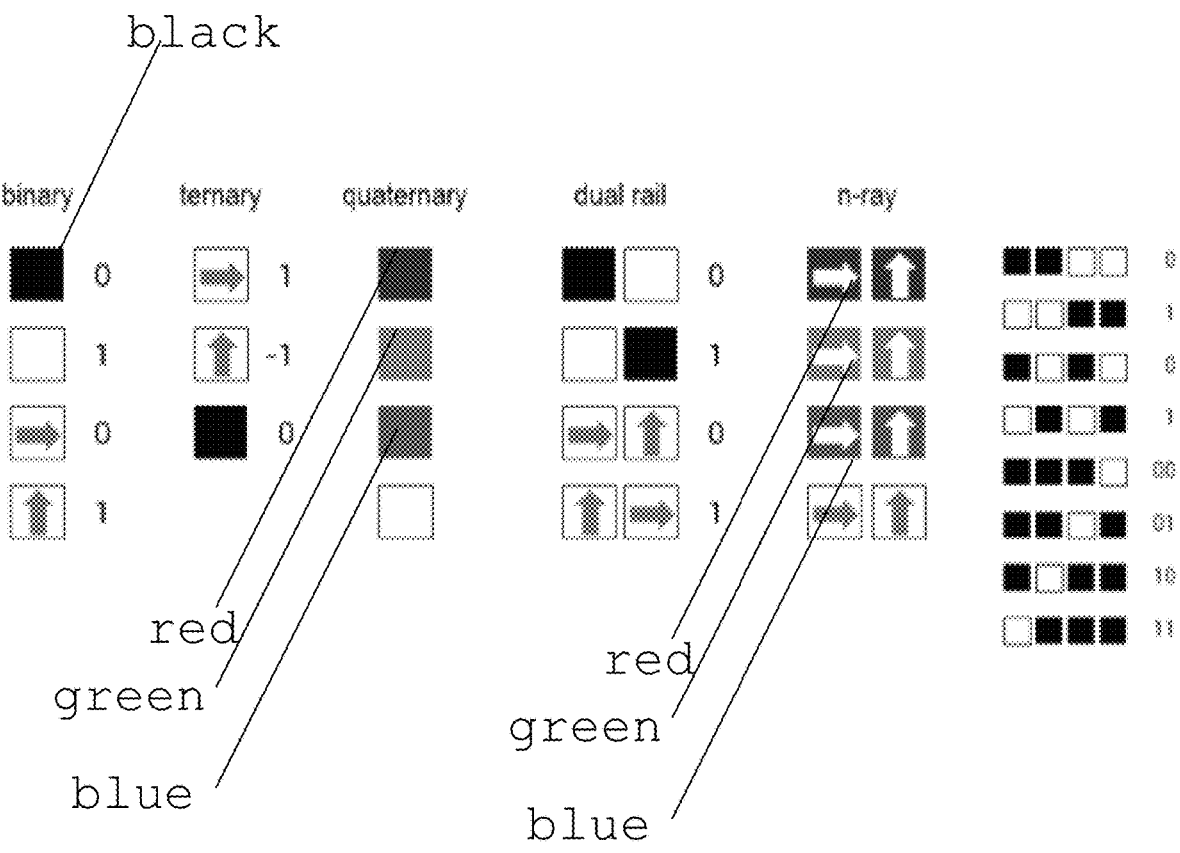
FIG. 11 is a diagram showing the possible systems for coding the light in the computing system according to the present disclosure.

FIG. 11 shows an example of possible ways of coding the light in the computing system 1, based on a binary, ternary, quaternary, dual rail or n-rail system. The coding system is used, during modulation, to attribute to the light characteristics representing and corresponding to the data to be processed.

In the coding systems, the information is represented not only by the fact that the light is opaque (black) or white (transparent) as already explained above, but also by further characteristics of the light (i.e. of the light ray), in particular the direction of the white light, indicated by the respective arrows in FIG. 11 in a white square, or further colours, such as blue, green and red, indicated by the respective coloured squares in FIG. 11, or by the direction of the coloured light, indicated by the respective arrows with coloured squares in FIG. 11.

Figure 9:
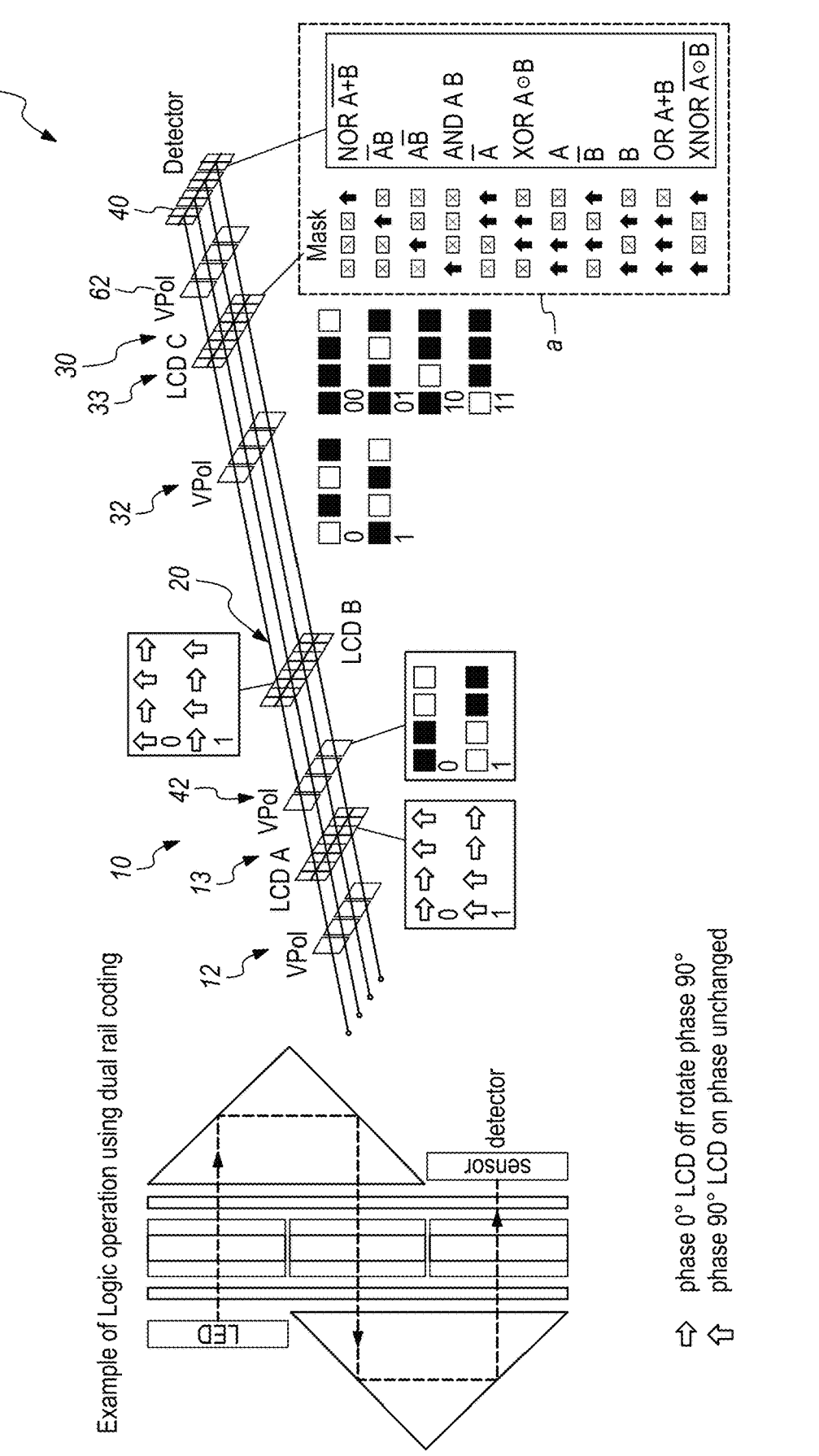
FIG. 9 is a schematic illustration of the optical computing system used according to a possible coding system provided by way of a non-limiting example in the present disclosure.

FIG. 9 illustrates in schematic form and based on a logic system (i.e. essentially associated with the hardware arrangement of the components) the operation of the computing system 1, for example based on the hardware architecture of FIG. 2.

In the first module 10 and in the second module 20 the serial data input into the computing system is encoded by means of one of the coding systems shown in FIG. 11, thus attributing to the light a predetermined modulation, representing the input data, in optical form. This representation is shown in the logic diagram of FIG. 9 as the output of the second module 20.

Figure 10:
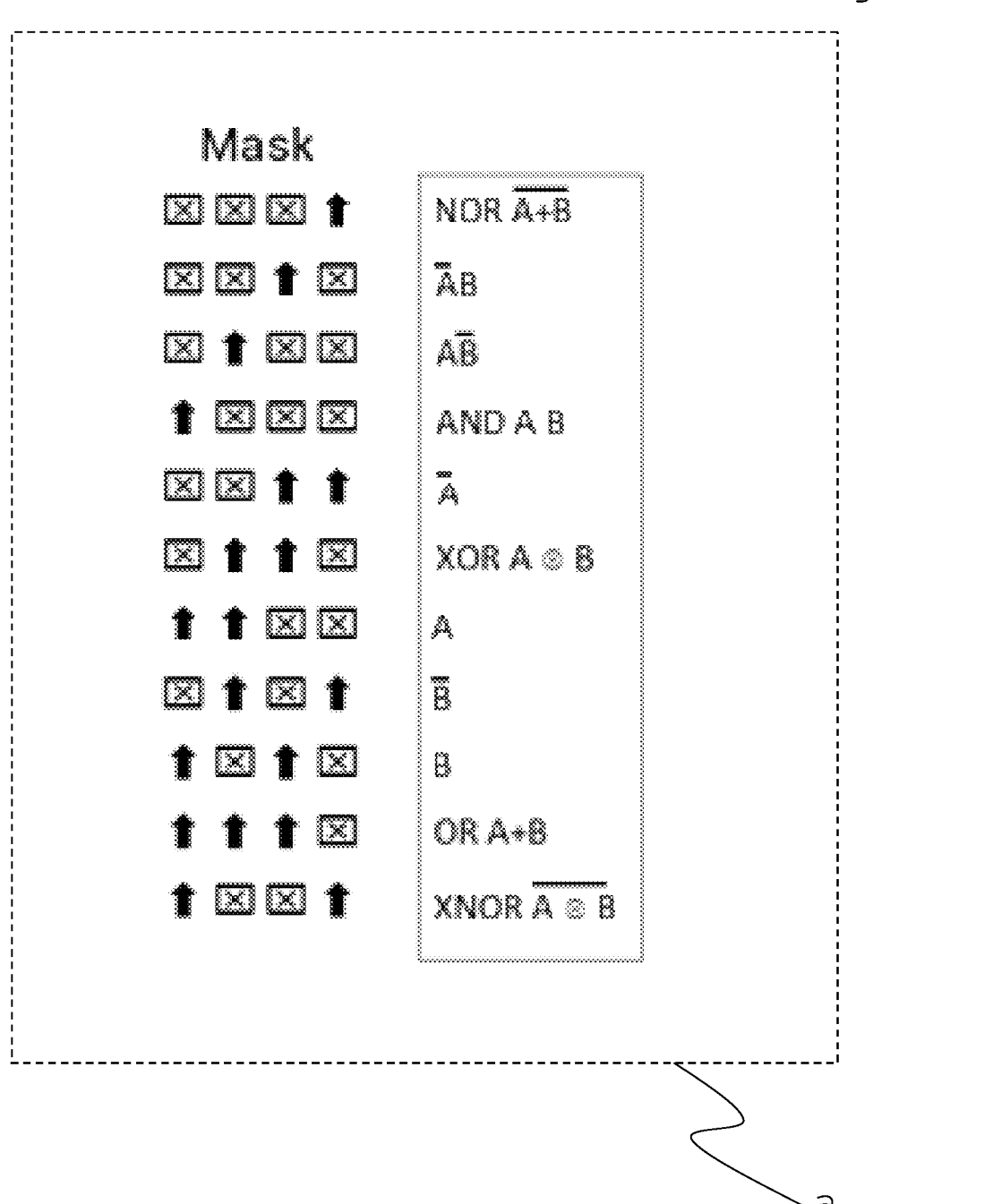
FIG. 10 is a detail (a) of FIG. 9.

The third module 30 applies a calculation to the light rays output from the second module 20. This calculation is predefined on a calculation mask, which converts the optical data (i.e. the rays) input into the third module 30. The calculation mask is not clearly visible in FIG. 9 and therefore is shown on a larger scale in FIG. 10. The calculation mask is predefined depending on the calculation, i.e. the processing which is to be carried out on the light rays, inside the third module 30. Therefore the third module 30 can be configured, by redefining different calculation masks.

Again based on the coding system adopted for modulation of the light, for example one of the systems shown in FIG.

11, the result of the optical calculation may be reconverted in the detector 40 into corresponding digital data intended for an external system.

The invention claimed is:

1. Parallel optical computing system comprising:
   at least one first module (10) comprising at least one polarization filter (12) and at least one liquid crystal cell (13), the first module (10) being configured as an optical modulator (100) for receiving light from a light source (70) and for encoding the light output from the liquid crystal cell (13) into optical data to be processed;
   at least one second module (20) comprising at least one polarization filter (22) and at least one liquid crystal cell (23), the second module (20) being able to be configured as an optical processor (200) for receiving the optical data to be processed and for outputting an optical result of the processing;
   at least one optical detector (40), designed to receive the optical result of the processing and convert the optical result into a corresponding electrical result.

2. Optical computing system according to claim 1, comprising at least one prism (50) configured to receive the optical data from the first module (10) and to reflect the optical data to the second module (20), where the first module (10) and the second module (20) are vertically aligned and the prism (50) comprises a base (51) parallel to the at least one cell of the first module (10) and second module (20), situated facing them, and inclined walls (52) connected to the base (51), for reflecting the optical data from the first module (10) to the second module (20).

3. Optical computing system according to claim 1, where the second module (20) is configured as an optical processor (200) and the optical detector (40) is configured to receive the optical result from the second module (20).

4. Optical computing system according to claim 1, characterized in that it comprises at least one third module (30) vertically aligned with the first module (10) and the second module (20), underneath the second module (20), and configured to receive the optical data from the second module (20), where said second module (20) is configured as a second optical modulator (101) or as an optical processor (200) and said third module is configured, respectively, as an optical processor (200) or as a second optical processor (201) and in that it comprises at least one second prism (80) configured to receive the optical data from the second module (20) and to reflect the optical data to the third module (30), where the second prism (80) comprises a base (81) parallel to the at least one cell of the second module (20) and third module (30), situated facing them, along a surface (24) of the second module (20) opposite to the surface (25) of the second module (20) where the first prism (50) is situated, and inclined walls (86) connected to the base (81), for reflecting the optical data from the second module (20) to the third module (30), the optical detector (40) being configured to receive the optical result from the third module (30).

5. Optical computing system according to claim 1, characterized in that said first module (10) is situated facing said second module (20).

6. Optical computing system according to claim 5, characterized in that it comprises a third module (30) facing said second module (20).

7. Optical computing system according to claim 6, characterized in that the second module (20) is configured as an optical modulator (101) or as an optical processor (200) and said third module (30) is configured, respectively, as an optical processor (200) or as a second optical processor (201), and the optical detector (40) is configured to receive the optical result from the third module (30).

8. Optical computing system according to claim 1, characterized in that each of said first module (10), second module (20) or third module (30) comprise multiple liquid crystal cells arranged horizontally and/or vertically adjacent in a plane of the first module (10), second module (20) or third module (30), substantially along two perpendicular axes X, Y of the plane, said adjacent arrangements of cells forming a screen of said computing system (1).

9. Optical computing system according to claim 8, characterized in that it comprises a plurality or an array of aligned screens.

10. Optical computing system according to claim 1, characterized in that said light source (70) comprises multiple non-polarized white light sources or LEDs, each of said light sources being aligned with a respective liquid crystal cell of said first module (10).

11. Optical computing system according to claim 10, characterized in that said each cell (13) of said plurality of cells of the first module (10) is configured to transmit a modulated light ray towards a respective cell (23) from among a plurality of cells of the second module (20), said cell (13) of the first module being aligned with the respective cell (23) of the second module along the direction Z of emission of the light ray or situated at a predetermined distance with respect to the cell (13) of the first module (10) in a plane X, Y where the ray emitted in the direction Z from the cell (13) of the first module is reflected in the direction Z, for example by means of an optical prism associated with the cell (13) of the first module and the second module (23).

12. Optical computing system (1) according to claim 1, characterized in that said optical modulator (100) is configured to modulate the incoming light based on a binary, ternary, quaternary, dual-rail or n-rail logic coding system.

13. Optical computing system (1) according to claim 1, characterized in that said optical processor (200) is configured to perform calculations on the light rays emitted by the optical modulator (100), said calculations corresponding to a calculation mask predefined in the optical processor (200).

14. Optical computing system (1) according to claim 13, characterized in that said optical processor (200) is programmable so as to define a calculation mask in the optical processor (200), said calculation mask being loaded into the optical processor (200) as predetermined states of the multiple liquid crystal cells of the optical processor.

\* \* \* \* \*